Nov. 18, 1930.  I. D. FORD  1,782,166

SECURING MEANS

Filed Dec. 22, 1927

Inventor
Ira D. Ford
By: Emery, Booth, Janney & Varney
Attys.

Patented Nov. 18, 1930

1,782,166

UNITED STATES PATENT OFFICE

IRA D. FORD, OF ROSELAND, ONTARIO, CANADA, ASSIGNOR TO UNIVERSAL BUTTON FASTENING & BUTTON CO., OF DETROIT, MICHIGAN, A CORPORATION OF MICHIGAN

SECURING MEANS

Application filed December 22, 1927. Serial No. 241,761.

This invention relates to snap fastener securing means and aims to provide improved means for utilizing snap fasteners for detachably securing pieces of cloth together.

The invention may be readily understood by reference to one illustrative embodiment thereof shown in the accompanying drawing, in which:

Fig. 2 is a bottom plan section taken along the line 2—2 of Fig. 1 to show the area of cloth which lies between the prongs of the fastener;

Fig. 3 is a bottom plan section taken along the line 3—3 of Fig. 1 showing the under side of the top or exposed fastener, certain parts having been broken away to show the interior construction of the fastener head;

Fig. 4 is a sectional plan taken along the line 4—4 of Fig. 1; and

Fig. 5 is an elevation of a double pronged fastener before the prongs have been upset in the attaching operation.

Figure 1:
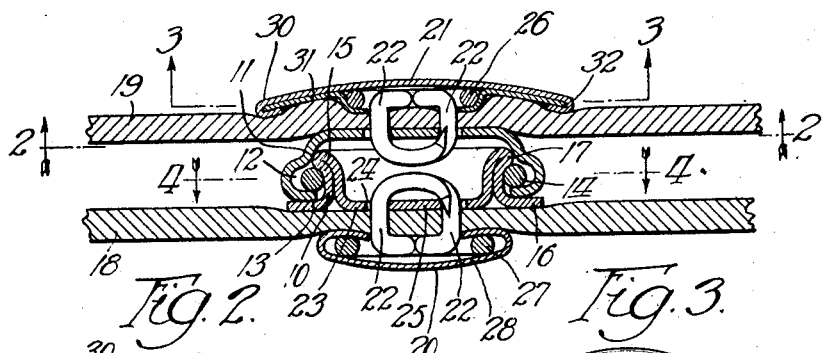
Fig. 1 is a section through the elements of a closed snap fastener holding together two pieces of fabric.
Figure 1:
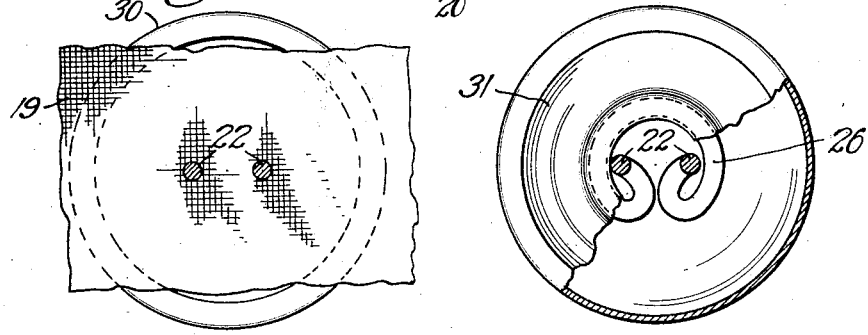
Figure 1:
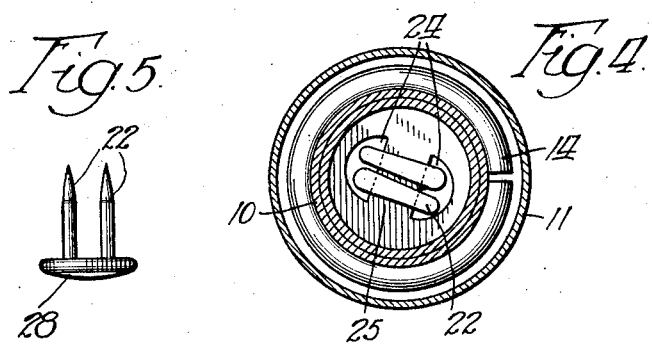

In the illustrative construction the interfitting parts 10 and 11 represent the parts of a snap fastener and may for convenience be referred to as the stud part and socket part, respectively. The socket part 11 consists of a cup shaped member advantageously pressed from sheet metal and having an interior groove 12 adjacent the edge 13 of the rim of the cup or socket. Loosely held within the groove is a spring ring 14 which in this instance extends almost but not quite around the circumference of the groove.

The stud part 10 comprises in this instance, a circular flange or stud 15 advantageously of double thickness and projecting from a base flange 16 which is preferably integral with the circular flange for simplicity and manufacturing economy. The free edge of the stud flange 15 is advantageously upset to provide a rounded bead 17 whose external diameter is slightly greater than the normal or unstrained internal diameter of the spring 14. The depth of the projecting stud 15 is such that it may enter the socket part 11 during which movement the spring ring 14 is expanded thereby to pass over the bead 17 after which it contracts around the neck or portion of the flange 15 under the bead. The internal diameter of the groove 12 is made sufficiently larger than the normal diameter of the ring to allow room for expansion of the ring in passing over the bead 17.

The spring strength of the spring ring 14 and the size of the bead 17 are designed to offer the desired resistance to separation of the stud and socket parts of the fastener. Where the fastener is designed for holding together portions of a cloth garment, for example, the resistance to separation of the stud and socket must be at least great enough to withstand the tension (which is sometimes relatively large) exerted in the normal use of the garment.

The fastener parts are advantageously secured to the overlying pieces 18 and 19 of the fabric by means which do not impair or weaken the fabric. In the present instance such means comprise headed and pointed-prong attaching fasteners 20 and 21, respectively, said prongs pierce the fabric without materially severing or weakening any part thereof. The prong elements of the attaching fasteners after piercing the fabric are secured under pressure to the respective snap fastener parts, as by upsetting the ends of the prongs. The tension in the fastener prongs is sufficient to cause the bases of the stud and socket parts and the fastener heads tightly to grip or compress the fabric between them. In the drawing each piece of fabric is shown compressed by the gripping action of the elements of each fastener part. The degree of compression necessary to effect a sufficient grip upon the fabric obviously depends somewhat on the character and thickness of the fabric or layers of fabric to which the fastener is secured.

The grip of the pronged fastener head and the base of the fastener part upon the fabric should be firm enough to contribute substantially to securing the fastener part in place and should be adequate to withstand the usual pull upon the cloth (which with some snap fasteners may be relatively strong) necessary to separate the fastener parts, so that in the ordinary case the tendency to displace the fabric between the gripping head and base is effectively resisted.

In the present case the attaching fasteners 20 and 21 are each provided with a pair of spaced, pointed prongs 22 which pierce the fabric (without weakening it) at separated points so that a substantial portion of the gripped area comprises cloth which lies between the prongs (see Fig. 2). Each of the snap fastener parts is advantageously provided with a base commensurate in size with the head of a pronged fastener so as to grip the maximum area of fabric, each base in this instance contacting throughout its surface with the fabric. The stud part 10 of the fastener is designed to provide a central base portion 23 in addition to the base provided by the flange 16. The stud part thus designed may readily be formed from a single piece of sheet metal. The openings 24 and the bar 25 in the base portion 23 represent means by which the prongs of the fastener 20 may effectively engage the stud part and hold it in gripping engagement with the fabric. This construction is advantageously provided in the present instance by punching or piercing the base portion 23 at separated points to form the spaced openings 24 and the intervening bar 25 integral with the metal of the base portion. The prongs of the fastener after piercing the fabric, enter the holes 24 and are upset inside the fastener part,—in this case by being bent in opposite directions over the bar 25 by means of an appropriate die which, in conjunction with an opposite die or the like in engagement with the head of the fastener 20, applies the necessary compression or gripping pressure to the stud, fastener, and the fabric.

The prong elements of the fastener are in the present case provided by a headed staple 26 made of wire which is bent, intermediate its ends into a sort of C-shape to provide a substantially circular head 27. A finishing cap 28 is advantageously placed over the head and the margins of the cap tightly crimped underneath the head, which is slightly flattened, marginally (see Fig. 1) in the crimping operation. Within limits the head of the fastener may be made larger than the diameter of head 27 by employing a larger cap.

The base 20 of the socket part 11 is advantageously provided with the spaced holes and transverse bar in the same manner as the socket part; and the base similarly cooperates with its pronged fastener head to grip the fabric.

For purposes of decoration or advertisement the outer or top fastener 21 is advantageously provided with a head 30 larger than that necessary merely for attaching purposes. The outer surface of the head may be decorated or designed for advertising purposes or both by appropriate plating and embossing. In the present case a large head is provided while still using the type of staple 26 illustrated, by a metal disk 31 through which the prongs of the staple are pressed and into which the head of the staple is pressed. Thus the size of the head is not limited by the size of the staple head. The cap 32 over the disk not only provides the necessary decoration or advertisement but securely holds the head of the staple against the disk. The cap and disk are in this case given a convex outer surface (see Fig. 1), thereby providing a cavity on the concave under side into which the base of the socket part 11 may partly recede so as not to increase the total thickness of the assembled fastener.

The piercing of the fabric by the prongs 22 of the fasteners not only preserves the integrity of the fabric but avoids any wrinkling thereof, so that it may be gripped smoothly. Sice the integrity of the fabric is preserved, the fabric cannot readily slip or move between the gripping heads. Moreover, the prongs 22 around which the fabric is tightly gripped cooperate to resist any tendency of the cloth to slip; and since the fabric is not weakened by the attachment of the snap fastener parts, a slit in the fabric cannot readily start. Such cloth tension as actually reaches the prongs, is in this instance divided among two prongs, thereby further reducing any slitting stress imposed on the fabric.

I have discovered that a pull of over one hundred pounds can be applied to snap fasteners attached to overall denim in the manner illustrated, without tearing the cloth. Since the typical snap fastener for this purpose requires less than a pull of twenty-four pounds to separate the stud from the socket, the large factor of safety provided insures that the garment will wear out before it becomes torn at the fasteners.

Obviously the invention is not limited to the details of the illustrative construction, since these may be variously modified. Moreover it is not indispensable that all features of the invention be used conjointly since various features may be used in different combinations and sub-combinations.

Having described one embodiment of my invention, I claim:

1. Means for securing cloth fabric together comprising in combination a pair of interfitting snap fasteners each having a relatively large base constructed and arranged to engage a substantial area of cloth, a fastener attaching means for each fastener part comprising a cloth engaging head corresponding in size to the fastener base and having a pair of spaced cloth piercing prongs projecting therefrom, each base being pierced at separated points and providing spaced openings and an intervening bar, said intervening bar being flat and continuously smooth on both sides thereof, the prongs of the attaching means being bent around the bars of the respective fastener parts under pressure, whereby a substantial area of cloth is gripped between the fastener base and the attaching head and the area of cloth between the fastener prongs cooperates to prevent separation of the fastener from the cloth.

2. Means for securing cloth fabric together comprising in combination a pair of interfitting snap fasteners each having a relatively large base constructed and arranged to engage a substantial area of cloth, a fastener attaching means for each fastener part comprising a cloth engaging head corresponding in size to the fastener base and having a pair of spaced cloth piercing prongs projecting therefrom, each base being pierced at separated points and providing spaced openings and an intervening bar, said intervening bar being flat and continuously smooth on both sides thereof, the prongs of the attaching means being bent around the bars of the respective fastener parts under pressure, whereby the tension of the cloth is distributed between two prongs so as to reduce the tendency of the cloth to be slit by the prongs.

3. Means for securing cloth fabric together comprising in combination a pair of interfitting snap fasteners each having a fabric-engaging base, a fastener attaching means for each fastener part comprising a cloth engaging head having a pair of spaced cloth piercing prongs projecting therefrom, each of said fastener parts having means for receiving and engaging the respective attaching prongs, the means for engaging the prongs being between said prongs and being flat and continuously smooth on both sides thereof, the prongs of each element piercing the cloth at spaced points without weakening it and being upset under pressure inside the respective fastener parts, whereby the cloth is gripped between the fastener base and the attaching head and a portion of the gripped area of cloth lying between fastener prongs so that the fastener parts may be separated by a pull applied directly to the cloth without subjecting the cloth to tearing strains, said fastener parts each being open on the interior to expose the attaching prongs so that said prongs may be directly engaged to upset them.

4. Means for securing cloth fabric together comprising in combination a pair of interfitting snap fasteners each having a relatively large base constructed and arranged to engage a substantial area of cloth and provided with a transverse attaching bar, a headed, double pronged attaching fastener for each of said snap fastener parts whose head engages the opposite side of the fabric and whose prongs pierce said fabric at spaced points without tearing or weakening it and are tightly bent around the attaching bar from opposite sides, said bar being flat and continuously smooth on both sides thereof, each of said fastener parts being open on the interior whereby the fastener prongs may be directly engaged to bend them over the attaching bar under tension so that the fabric is tightly clamped between the snap fastener base and the head of the attaching fastener.

5. Means for securing cloth fabric together comprising in combination a pair of snap fasteners, each fastener having spaced fabric engaging members, one member of each fastener being a base and the other member of each fastener being a cap, the base of one fastener having a lateral portion for interlocking engagement with a portion of the base of the other fastener, and attaching means for the spaced fabric engaging members of each fastener comprising two headed and double pronged elements, one for each snap fastener, and each element formed of wire, the heads of said double pronged elements simulating split rings and secured to and concealed by said caps, and the prongs of said headed elements being centered relative to said rings and extending through and secured to the respective bases.

6. A snap fastener structure including two spaced fabric engaging members, one being a base and the other a cap, said cap having a marginal open return bent flange, and said base having a lateral portion for interlocking engagement with a portion of another snap fastener, and the connection between said cap and base including a headed and double pronged element formed of wire having the head thereof in the form of a split ring and received in and held by the open return bent flange of the cap and having the prongs thereof extending through and secured to said base.

7. A snap fastener structure including two spaced cloth engaging members, one being a base and the other a cap, said base having a lateral portion for interlocking engagement with a portion of another snap fastener, and said cap being formed of two sections, one section having an open return bent flange, and the other section having a portion received in and held by said open return bent flange, and a connection between said cap and base including a headed and double pronged element of wire having the head thereof in the form of a split ring and received between and held by the sections of said cap, and having the prongs thereof extending through and secured to said base.

8. A snap fastener structure including two spaced cloth engaging members, one being a base and the other a cap, attaching means including a headed and double pronged fastener formed of wire and having the head thereof secured to said cap and having the prongs thereof extending through and secured to said base, said head being a split ring about said prongs and overlapping a material portion of and constituting a reinforcement and backing for the cap aforesaid, and a snap fastener part projecting from said base and disposed substantially concentric with and receiving said prongs.

In testimony whereof, I have signed my name to this specification.

IRA D. FORD.